Nov. 29, 1932.     E. HURLBRINK     1,889,096
DEVICE FOR MEASURING LIQUIDS
Filed Aug. 27, 1930
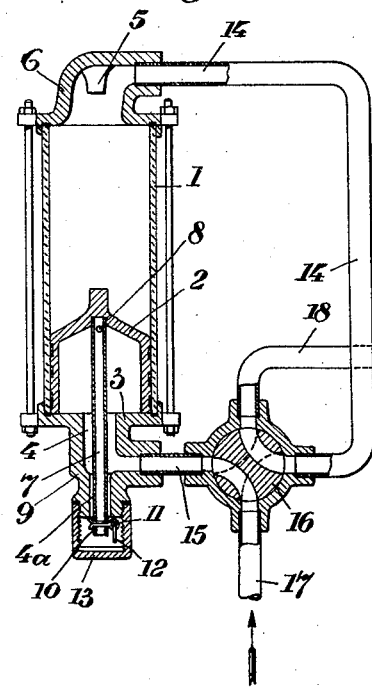
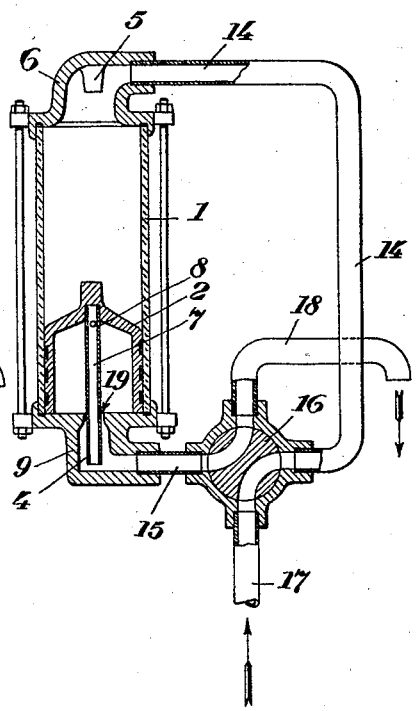
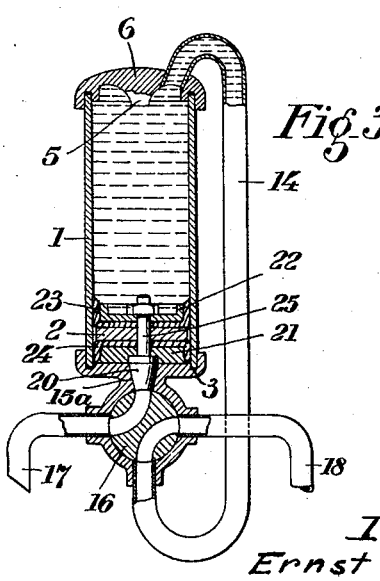
Inventor,
Ernst Hurlbrink,
By his Attorney,
Harold D. Penney Patented Nov. 29, 1932

1,889,096

UNITED STATES PATENT OFFICE

ERNST HUELBRINK, OF BERLIN-WESTEND, GERMANY, ASSIGNOR TO THE FIRM FABRIK EXPLOSIONSSICHERER GEFASSE SALZKOTTEN G. M. B. H., OF SALZKOTTEN, GERMANY

DEVICE FOR MEASURING LIQUIDS

Application filed August 27, 1930, Serial No. 478,034, and in Germany September 2, 1929.

My invention relates to devices for measuring liquids, especially of oil, in which devices the measurement is accomplished by means of a measuring cylinder in which a flying piston may be moved to and fro by the liquid alternately fed under pressure to the one or to the other cylinder end, so that the piston removes the liquid from said other or said first mentioned cylinder end into the tapping duct respectively.

In measuring devices of the kind mentioned the alternating communication of the one and the other cylinder end with the inlet duct for the liquid commonly is effected by means of a controlling element consisting ordinarily in a valve, and the number of the controlling movements of the said element indicates the quantity of the delivered liquid. The measuring cylinder which contains the piston ordinarily is made of glass, so that the movements of the piston and the correct filling up and emptying of the cylinder may be easily surveyed.

If measuring devices of the said class are provided with vertically extending measuring cylinders, as it is desirable, it is difficult to remove the air below the piston at the first filling up with liquid or to keep after the beginning of the operation the lower side of the piston free from air or gas taken along by the liquid entering the respective part of the cylinder. As the exactness of the measurement is unfavorably affected by air or gas remaining below the piston, the general object of my invention consists in providing means for facilitating the removal of air or gas from the lower side of the piston. Further objects and features of my invention will appear as the following specification proceeds.

In the drawing several embodiments of my invention are illustrated.

Fig. 1 is a vertical sectional elevation of a measuring device of the class described in which the air may be completely removed from the lower side of the piston at the beginning of the operation and the first filling up of the measuring cylinder.

Fig. 2 is a vertical sectional elevation of a modification in which the removal of air from the lower side of the piston may be attained in the regular operation of the measuring device.

Fig. 3 is a vertical sectional elevation of another modification of my invention in which a rather complete removal of the gas and air from the lower side may be attained also in the regular operation.

According to Fig. 1 a cap-like piston 2 is movable in the glass cylinder 1, and the stroke of the said piston is limited in its upper end by an abutment on the cover 6 of the cylinder, while in the lower end of the stroke the piston sits with its lower edge down on the bottom 3 of the cylinder. In the piston 2 a tube 7 is inserted which communicates with the cavity of the lower side of the piston through the intermediary of transverse bores 8 in said tube which are provided at the highest point of the lower side of the piston. The tube 7 is of such a length that in the low position of the piston 2 the lower open end of the tube protrudes from the socket 9 adjacent the bottom 3 of the cylinder which socket communicates with the duct 15 leading to the reversing or controlling valve 16. The duct 15 communicates with an axial bore 4 of the socket 9. The upper end of the said bore opens into the cylinder 1, and the lower end of the tube 7 extends through a lower section 4$a$ of the said bore which section is of a smaller diameter. On its end protruding from the socket 9 the tube 7 has a transverse bore 10 for the reception of a cotter-pin on which a ring 12 is hanging. The protruding parts may be covered by a screwed cap 13.

The controlling valve 16 is communicating with the inlet duct 17 for the liquid and also with the outlet or tapping duct 18. The upper end of the cylinder communicates with the valve 16 through the intermediary of a duct 14.

For the first operation of the device after its mounting the cap 13 is screwed off after which the delivery of the liquid is started. In accordance with the position of the passages of the valve plug defined in the figure by full lines the liquid to be measured enters the space below the lower side of the piston 2 through the ducts 17 and 15. The air below the piston will escape through the bores 8 and the tube 7 to the outside. Simultaneously some liquid runs out through the bore 4a which liquid may be collected in a pot. As soon as all the air is removed, liquid will run out of the tube 7 which is the signal for the complete removal of the air which would otherwise affect the measurement. By pulling on the ring 12 the cotter-pin 11 now may be drawn out and the piston 2 released which is then forced upwards by the pressure of the liquid until the upper projection of said piston strikes against the abutment 5. In this moment the whole cross-section of the bore 4 will be given free for the discharge of the liquid which discharge is now interrupted by screwing on of the cap 13.

After this the liquid may be delivered to the upper end of the cylinder by reversing the valve plug 16 into the position defined by the dotted lines of the Figure 1. Thereby the liquid below the piston will be removed through the duct 15 and the reversing valve 16 into the tapping duct 18. As soon as the piston 2 has reached its lower end position the controlling valve is reversed, so that communication is again established between the lower end of the cylinder and the inlet duct 17 and also between the upper end of the cylinder and the tapping duct 18. After having repeated this proceeding two times, the measuring device is completely filled with liquid, so that the device does no more contain any air or gas bubbles, which could infavorably influence the measurement.

The measuring device shown in Fig. 2 differentiates from the device described by the feature of the venting tube 7 not leading to the outside but dipping with its lower end into the channel 4 of the socket 9 through which the duct 15 communicates with the lower end of the cylinder. In consequence thereof the channel section 4a leading to the outside as according to the first described construction is avoided. The remaining channel section 4 is provided with a contraction 19 which, when the piston 2 comes in its downward stroke into its lower end position, throttles at this point the passage of the liquid, so that the pressure liquid in the bore 4 is considerably smaller than in the cylinder below the piston 2.

The operation of the device according to Fig. 2 is as follows:

As soon as in the first downwardly directed stroke of the piston 2 the tube 7 dips into the reduced portion 19 of the duct 4 the air in the cavity of the piston is expelled through the tube 7 into the channel section 4 under the influence of the difference of pressures in the said cavity and in the said channel section. This air will flow from the channel section 4 together with the running liquid into the tapping duct 18, so that already after the first upward and downward stroke of the piston the measuring device is free from nuisible accumulations of air or gas. Afterwards such accumulations can no more take place during the regular working.

In the embodiment according to Fig. 3 a disc piston 2 is provided in the cylinder 1 which piston is packed with collars 23, 24 which preferably consist of leather in the case that the liquid to be measured is oil. As shown in Figure 3 the said collars are arranged back to back on the piston 2 in the usual manner. The collars are fastened to the piston by means of washers 21, 22 which are held in position by a screw-bolt 25.

In the lower end position of the piston the lower washer 21 lies close on the bottom 3 of the cylinder, so that said washer completely fills up the cavity between the said bottom of the cylinder and the piston. The reversing valve is preferably closely adjacent the bottom 3 of the cylinder, so that the passage 15a connecting the valve housing with the measuring cylinder is very short. This bore is preferably conical and is at times completely filled up by a correspondingly shaped projection 20 of the piston 2, so that the lower end surface of the projection 20 lies close on the rotary plug of the valve 16. The projection 20 may be formed by a protruding part of the filler disc 21 or, as Fig. 3 shows, by the head of the screw-bolt 25.

In the lower end position of the piston 2 the filler piece will directly sit down on the bottom 3 of the measuring cylinder, whereby the air below the piston is not only removed from the cylinder but also from the bore 15a by means of the projection 20.

When beginning with the operation the piston 2 is at first moved several times up and down by introducing liquid from the duct 18 and reversing the controlling valve 16 for several times. At each downward stroke the air below the piston is removed in the already mentioned way into the plug of the valve 16 and into the tapping duct 17, so that only very small quantities of air remain below the piston which quantities will not unfavorably influence the exactness of the measurement in a practically determinable degree even in the case that the pressure is varying with which the piston is pressed against the abutment limiting its stroke.

I claim:

1. Device for measuring liquids, especially oil, comprising a cylinder having an upper and a lower end wall, a piston freely movable in said cylinder, means for limiting the motion of the piston in an upper and in a lower end position, a lower duct for the liquid in communication with the lower end of said cylinder, an upper duct for the liquid in communication with the upper end of said cylinder, means for controlling said ducts for the liquid, and means on the lower side of said piston adapted to remove gaseous fluidquantities arising on the lower side of said piston.

2. Device for measuring liquids, especially oil, comprising a cylinder having an upper and a lower end wall, a piston freely movable in said cylinder, means for limiting the motion of the piston in an upper and in a lower end position, a lower duct for the liquid in communication with the lower end of said cylinder, an upper duct for the liquid in communication with the upper end of said cylinder, means for controlling said ducts for the liquid, a venting duct extending substantially in a downward direction and being on its one end in communication with the highest point of the lower side of said piston, a passage opening at the lower end of said cylinder, said opening being adapted to establish communication between the interior of said cylinder below said piston and the outside, said venting duct being adapted to be brought in communication with the outside in the lower end position of said piston, and means for arbitrarily holding the said piston fast in its lower end position.

3. Device for measuring liquids, especially oil, comprising a cylinder having an upper and a lower end wall, a piston freely movable in said cylinder, means for limiting the motion of the piston in an upper and in a lower end position, a lower duct for the liquid in communication with the lower end of said cylinder, an upper duct for the liquid in communication with the upper end of said cylinder, means for controlling said ducts for the liquid, a passage in said lower end wall adapted to be brought in communication with the outside, a tube fixed on said piston and extending downwardly from the lower side of the piston, the highest point of the lower side of said piston communicating through an aperture with the interior of said tube, said tube being adapted to enter said passage and having such a length that it protrudes from the lower end of such passage in the lowest end position of said piston, and means for holding fast the said tube in the position in which it protrudes from the said passage.

4. Device for measuring liquids, especially oil, comprising a cylinder having an upper and a lower end wall, a piston freely movable in said cylinder, means for limiting the motion of the piston in an upper and in a lower end position, a lower duct for the liquid in communication with the lower end of said cylinder, an upper duct for the liquid in communication with the upper end of said cylinder, means for controlling said ducts for the liquid, a passage in said lower end wall adapted to be brought in communication with the outside, a tube fixed on said piston and extending downwardly from the lower side of the piston, the highest point of the lower side of said piston communicating through an aperture with the interior of said tube, said tube being adapted to enter said passage and having such a length that it protrudes from the lower end of such passage in the lowest end position of said piston, means for holding fast the said tube in the position in which it protrudes from the said passage, and means for covering the lower end of said passage.

5. Device for measuring liquids, especially oil, comprising a cylinder having an upper and a lower end wall, a piston freely movable in said cylinder, means for limiting the motion of the piston in an upper and in a lower end position, a lower duct for the liquid in communication with the lower end of said cylinder, an upper duct for the liquid in communication with the upper end of said cylinder, means for controlling said ducts for the liquid, a passage communicating with said lower duct for the liquid and being adapted to establish communication between the interior of the cylinder and the outside, a downwardly extending tube fixed to said piston and adapted to enter the said passage, said tube communicating with the highest point of the lower side of said piston and being of such a length that it protrudes from said passage into the outside in the lower end position of said piston, and releasable means for holding fast the said piston in its lower position.

6. Device for measuring liquids, especially oil comprising a cylinder having an upper and a lower end wall, a piston freely movable in said cylinder, means for limiting the motion of the piston in an upper and in a lower end position, a lower duct for the liquid in communication with the lower end of said cylinder, an upper duct for the liquid in communication with the upper end of said cylinder, means for controlling said ducts for the liquid, a passage communicating with said lower duct for the liquid and being adapted to establish communication between the interior of the cylinder and the outside, a downwardly extending tube fixed to said piston and adapted to enter the said passage, said tube communicating with the highest point of the lower side of said piston and being of such a length that it protrudes from said passage into the outside in the lower end position of said piston, releasable means for holding fast the said piston in its lower position, and a cap for closing the said passage from the outside.

7. Device for measuring liquids, especially oil, comprising a cylinder having an upper and a lower end wall, a piston freely movable in said cylinder, means for limiting the motion of the piston in an upper and in a lower end position, a lower duct for the liquid in communication with the lower end of said cylinder, an upper duct for the liquid in communication with the upper end of said cylinder, means for controlling said ducts for the liquid, and a venting duct communicating with the highest piston and being connected with the piston, the said venting duct being of such a length that it may dip with its lower end into the lower duct for the liquid, in the lower end position of said piston.

8. Device for measuring liquids, especially oil, comprising a cylinder having an upper and a lower end wall, a piston freely movable in said cylinder, means for limiting the motion of the piston in an upper and in a lower end position, a lower duct for the liquid in communication with the lower end of said cylinder, said duct having a reduced portion near the lower end wall of said cylinder, an upper duct for the liquid in communication with the upper end of the cylinder, means for controlling the said ducts for the liquid and a venting tube fixed to said piston and communicating with the highest point of the lower side of the piston, the said venting tube extending downwardly and being of such a length that its lower end in the lower end position of the piston may dip into said reduced portion of said lower duct.

9. Device for measuring liquids, especially oil, comprising a substantially vertically arranged cylinder having a lower end wall, a piston freely movable in said cylinder, ducts for the liquid communicating with the upper and the lower end of the cylinder and means for controlling said ducts for the liquid, the lower surface of said piston being adapted to lie close to the inner surface of said lower end wall and to substantially fill up the interior of the respective duct for the liquid up to said controlling means.

10. Device for measuring liquids, especially oil, comprising a substantially vertically arranged cylinder having a lower end wall, a piston freely movable in said cylinder, an upper duct for the liquid communicating with the upper part of said cylinder, a lower duct for the liquid communicating with the lower part of said cylinder, a controlling element in close proximity of said lower end wall, the section of said lower duct between said controlling element and the lower end of the cylinder being of conical configuration, a filler-piece on the lower side of said piston adapted substantially to fill up the interior of the lower cylinder end in the lower end position of the piston, and a conical projection on the lower surface of said piston adapted substantially to fill up the conical section of the lower duct up to said controlling element.

11. Device for measuring liquids, especially oil, comprising a substantially vertically arranged cylinder having a lower end wall, a piston freely movable in said cylinder, collars for packing the said piston, an upper duct for the liquid communicating with the upper part of the cylinder, a lower duct for the liquid communicating with the lower part of the cylinder, a controlling element in close proximity of said lower end wall, the section of the lower duct for the liquid which lies between said controlling element and the lower end of the cylinder being of conical configuration, on the lower side of said piston a filler-piece adapted substantially to fill up the interior of the lower cylinder end in the lower end position of the piston, and a bolt connecting the said collars with the said piston, said bolt having a downwardly extending conical head adapted to fit closely into said conical section of said lower duct and to substantially fill it up in all its length in the lower end position of said piston.

12. Device for measuring liquids, especially oil, comprising a substantially vertically arranged cylinder having a lower end wall, a piston freely movable in said cylinder, said piston having a lower packing collar and a filler-piece adjacent said collar, ducts for the liquid communicating with the upper and the lower end of the cylinder, means for controlling the said ducts, said filler-piece being of such conformation that the lower side of the piston is adapted to lie in its whole dimension close to the inner surface of said lower end wall and to substantially fill up the interior of the lower duct for the liquid up to said controlling means.

13. Device for measuring liquids, especially oil, comprising a substantially vertically arranged cylinder having a lower end wall, a piston freely movable in said cylinder, ducts for the liquid communicating with the upper and the lower end of the cylinder, a controlling element in said lower end duct in close proximity of said lower end wall, the lower surface of said piston being adapted to lie close to the inner surface of said lower end wall, and a downwardly extending projection on said piston adapted in the lower end position of the piston to substantially fill up that part of the said lower end duct which lies between said controlling element and the lower end of said cylinder.

In testimony whereof I affix my signature.
ERNST HURLBRINK.